(12) United States Patent
Chen et al.

(10) Patent No.: US 6,785,702 B2
(45) Date of Patent: Aug. 31, 2004

(54) ENERGY SAVING MULTIPLICATION DEVICE AND METHOD

(75) Inventors: Oscal T.-C. Chen, Taipei (TW); Kuo-Hua Chen, Hualien (TW); Ruey-Liang Ma, I-Lan (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 455 days.

(21) Appl. No.: 09/861,572

(22) Filed: May 22, 2001

(65) Prior Publication Data

US 2002/0099751 A1 Jul. 25, 2002

(30) Foreign Application Priority Data

Nov. 29, 2000 (TW) .......................... 89125274 A

(51) Int. Cl.[7] .............................................. G06F 7/52
(52) U.S. Cl. ..................................................... 708/628
(58) Field of Search ................................. 708/628–630, 708/211

(56) References Cited

U.S. PATENT DOCUMENTS

| | | | | | |
|---|---|---|---|---|---|
| 3,192,363 A | * | 6/1965 | MacSorley | .................. | 708/628 |
| 4,276,607 A | * | 6/1981 | Wong | .......................... | 708/628 |
| 4,748,575 A | * | 5/1988 | Ashkin et al. | .............. | 708/211 |
| 5,485,413 A | * | 1/1996 | Kuboniwa | ................... | 708/630 |
| 5,787,029 A | * | 7/1998 | de Angel | .................... | 708/628 |
| 5,818,743 A | * | 10/1998 | Lee et al. | ................... | 708/628 |
| 6,021,424 A | * | 2/2000 | Chu | ........................... | 708/630 |
| 6,029,187 A | * | 2/2000 | Verbauwhede | ............. | 708/625 |

* cited by examiner

Primary Examiner—Tan V. Mai
(74) Attorney, Agent, or Firm—Sughrue Mion, PLLC

(57) ABSTRACT

An energy saving multiplication device and its method is disclosed. The multiplication device includes a dynamic range determination unit, a Booth encoding/decoding unit and a counter array. The dynamic range determination unit determines dynamic ranges of the numerical values to be multiplied together and outputs after processing according to the dynamic-range size relation of the input data. The Booth encoding/decoding unit couples to the dynamic range determination unit. The counter array couples to the Booth encoding/decoding unit for accumulating the partial products to obtain the products of the input data.

13 Claims, 4 Drawing Sheets

ENERGY SAVING MULTIPLICATION DEVICE AND METHOD

BACKGROUND OF THE INVENTION

1. Field of Invention

The present invention relates to an energy saving multiplication device and its method. More particularly, the invention relates to a Booth multiplication device that can lower power consumption and a method that uses the Booth multiplication device to lower power consumption.

2. Related Art

Along with the development in semiconductor manufacturing processes, digital signal processors (DSPs) and application specific integrated circuits (ASICs) adopt the energy saving system designs to satisfy the need in the portable device market. In the commonly seen complementary metal-oxide semiconductor (CMOS) circuits, the main power consumption is due to the charging and discharging of terminal capacitors when the transistor is under transition.

The multiplier in systems such as the digital filter and the DSP is a basic and important element and one of the crucial factors, that determines the system operating speed. However, the power consumption of the multiplier in a chip is relatively larger than other elements. As the DSP and the ASIC have more functions and are operating at higher frequencies, the extensive uses of the multiplier will result in immense power consumption.

The conventional 2's complement high speed multiplier can adopt the Booth algorithm to process the multiplicand and the multiplier and to generate partial products. A counter or compressor array with the Wallace-tree structure then performs addition operations on the partial products and outputs the multiplication result.

Referring to FIG. 1, in the Booth multiplier 100 the input multiplicand 110a and the multiplier 110b are received and transmitted by registers 102a, 102b, respectively, encoded/decoded by a Booth encoder/decoder 104, and processed to generate and output partial products 112. The partial products 112 are added by a counter 106 and a carry look-ahead adder (CLA) 108 then performs accumulation to obtain the product 114 of the multiplicand 110a and the multiplier 110b. From the operation mode of the conventional Booth multiplier one can learn that after completing Booth encoding/decoding, a huge amount of addition operations have to be performed and the addition operations will result in switching activities in the circuit.

The above-mentioned switching activities in the circuit due to additions are the reason for main power consumption in the conventional Booth multiplier. Thus, how to decrease the power consumption of a multiplier has become an important subject nowadays. The U.S. Pat. No. 6,021,424 discloses a multiplier with a lower-power, high-efficiency input circuit. By controlling the time and order of the input data, the data input are synchronous to decrease unnecessary power consumption. The U.S. Pat. No. 6,029,187 discloses another high-speed multiplier structure that can increase the operation speed and maintain the regularity of the multiplier structure. It improves the addition structure and method in the adder to balance the delay of data transmission and to decrease unnecessary power consumption.

"The low power multiplier disclosed in the U.S. Pat. No. 5,818,743 controls pulse signals to synchronously input the partial products for performing addition operations, thus decreasing the interior power consumption. The U.S. Pat. No. 5,787,029 proposes an extremely low power multiplier that decreases power consumption by improving the Booth encoder/decoder so that the decoded partial products change the subsequent addition operations. The U.S. Pat. No. 5,485,413 uses a multiplier using the Booth algorithm that can manipulate the sign extension in the multiplication operation to decrease the addition structure for the sign extension in partial products and to decrease the hardware structure complexity and power consumption."

Furthermore, the low power parallel multiplier disclosed in the U.S. Pat. No. 4,982,355 synchronizes the data output from each level to save power consumption. The U.S. Pat. No. 4,972,362 proposes a binary multiplier using the Booth multiplication algorithm and its method. It uses a Booth carry save adder (CSA) to process data using pipelines so that the internal pulse is synchronized with the system pulse. In these U.S. patents, the method to save power consumption can be categorized into three types: (1) modify the structure of the Booth encoder/decoder to lower the power consumption thereof and to change subsequent additions; (2) control to synchronize the data input to each level to decrease unnecessary internal power consumption; (3) save unnecessary addition structures in the sign extension of data. Nevertheless, these conventional techniques do not take in to account the influence of the dynamic range sizes of input data on the system power consumption.

SUMMARY OF THE INVENTION

In view of the foregoing, the switching activities due to addition operations on the partial products are the sources of main power consumption in currently widely used Booth multiplier. Therefore, the present invention provides a low power multiplication structure which can decrease the times of switching activities in the circuit to lower the power consumption and can be applied to a usual high-speed multiplier. It is then an object of the invention to provide a low power consuming multiplication device, which uses a dynamic range determination (DRD) unit to perform exchange actions of large and small dynamic-range numbers among input data. That is, the input datum with a smaller dynamic range is taken as a multiplier to perform Booth encoding/decoding. The power consumption is then decreased by increasing invalid partial products, thus decreasing the transition probabilities of the functional blocks after the Booth encoding/decoding unit.

It is another object of the invention to provide a multiplication method, which compares the numerical values to be multiplied together and chooses the smaller one (the one with a smaller dynamic range) to perform Booth encoding/decoding. Since the most-significant bits of the smaller dynamic-range one are a series of "0"s or "1"s, the numerical values of the partial products generated after the Booth encoding/decoding for the most-significant bits will be 0. The partial products are then shifted and accumulated to obtain the product of input numerical values.

Pursuant to the above-mentioned and other objects, the present invention provides a multiplication device comprising a dynamic range determination unit, a Booth encoding/ decoding unit and a counter array. The dynamic range determination unit determines dynamic ranges of the numerical values to be multiplied together and outputs after processing according to the dynamic-range size relation of the input data. The Booth encoding/decoding unit couples to the dynamic range determination unit and uses the input value with a smaller dynamic range as the multiplier to perform Booth encoding and then to perform Booth decoding with the other input value with a larger dynamic range to output partial products. The counter array couples to the Booth encoding/decoding unit for accumulating the partial products to obtain the product of the input data.

Furthermore, the present invention provides a Booth multiplication device, which includes an input master latch, a dynamic range determination unit, a transition control slave latch, a Booth encoding/decoding unit, a counter array and a carry look-ahead adder (CLA). The input master latch receives and transmits the numerical values to be multiplied together. The dynamic range determination unit couples to the input master latch to determine the dynamic ranges of the input numerical values and to pass or exchange data flows according to their dynamic-range size relation. The transition control slave latch couples to the dynamic range determination unit to receive and transmit numerical value segments with larger and smaller dynamic ranges. The Booth encoding/decoding unit couples to the transition control slave latch to take the numerical value segment with a smaller dynamic range as the multiplier to perform Booth encoding and then to perform Booth decoding with the other input value with a larger dynamic range to output partial products. The counter array couples to the Booth encoding/ decoding unit to accumulate the partial products. The CLA couples to the counter array to perform shifts and accumulation of the partial products to obtain the product of the input numerical values.

According to the above-mentioned and other objects, the present invention further provides a multiplication method comprising the steps of: inputting numerical values to be multiplied together; comparing the dynamic range sizes of the input numerical values and outputting the data with larger and smaller dynamic ranges, respectively; performing Booth encoding on the numerical value with a smaller dynamic range; decoding the Booth codes with the numerical value having a larger dynamic range to generate partial products; performing shifts and accumulation on the partial products to obtain the product of the input numerical values.

According to the above-mentioned and other objects, the present invention also provides a multiplication method comprising the steps of: inputting numerical values to be multiplied together; comparing the dynamic range sizes of the input numerical values; outputting segments with a smaller dynamic range; performing Booth encoding on the segments; decoding the Booth encoded segment with the numerical value having a larger dynamic range to generate partial products; performing shifts and accumulation of the partial products to obtain the product of the input numerical values.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

In currently widely used Booth multipliers, the operation method is to first perform Booth encoding on the entered multiplier in the multiplier, then to decode the entered multiplicand according to the coder to generate partial products, and then to accumulate all partial products using an adder to obtain the product, the result of the multiplication operation.

When performing Booth encoding/decoding operations, the partial products generated from the sign extension bits of the multiplier are always 0, invalid partial products, due to the property of the Booth algorithm. When comparing with the previously entered multiplier, if the corresponding partial products are simultaneously generated from the sign extension bits then the transistor will not experience any transition while performing addition operations for these partial products in the next level. Therefore, the present invention can decrease the times of switching activities and the power consumed. The invention performs comparison for the entered data in the multiplication device and the action of exchanging larger and smaller dynamic-range numbers. The entered datum with a smaller dynamic range is chosen as the multiplier to perform Booth encoding/ decoding so as to increase invalid partial products to minimize the probability for the transistors in the multiplication device to make transitions and to save energy.

Figure 1:
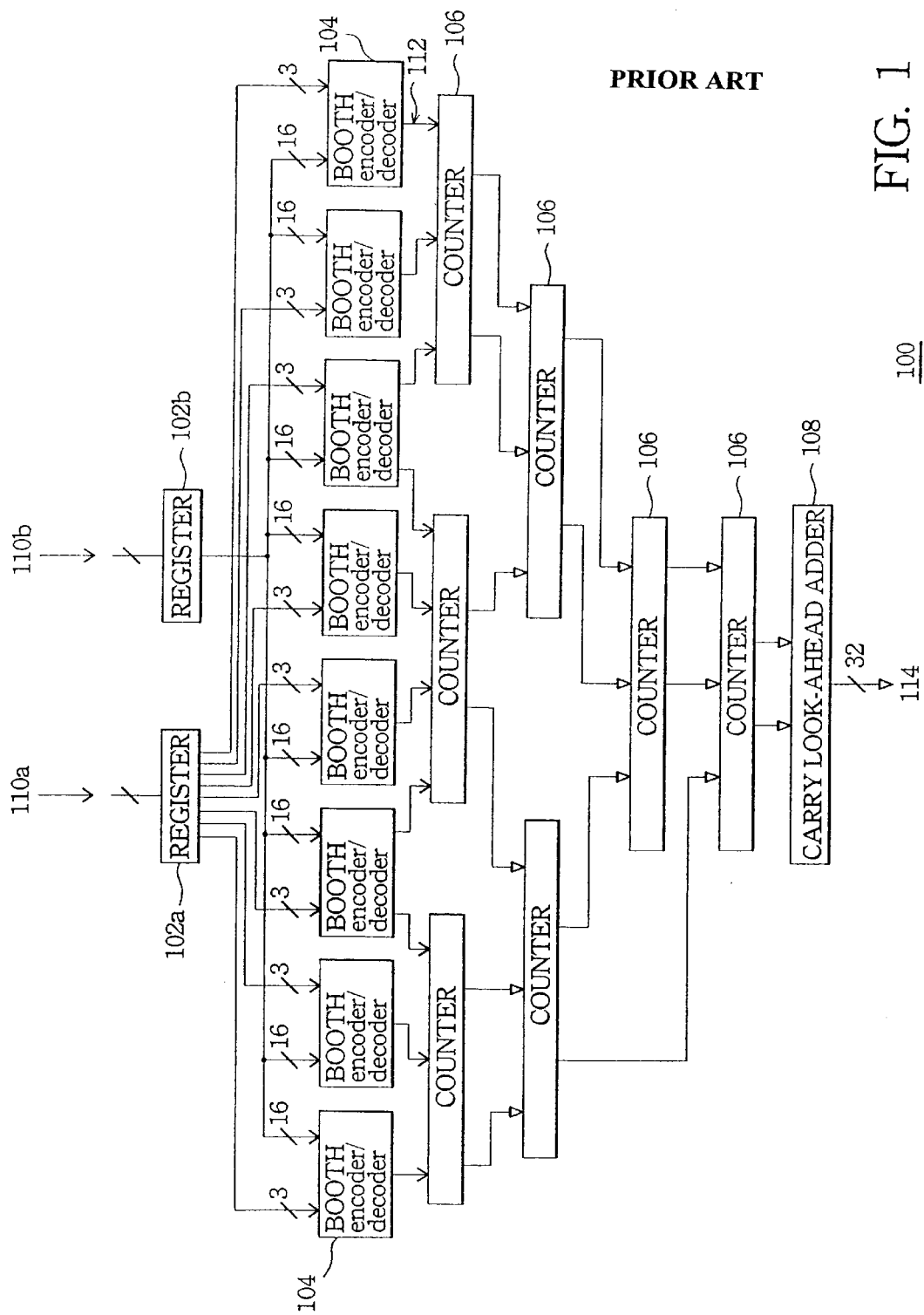
FIG. 1 is a schematic block diagram of a conventional Booth multiplier.
Figure 2:
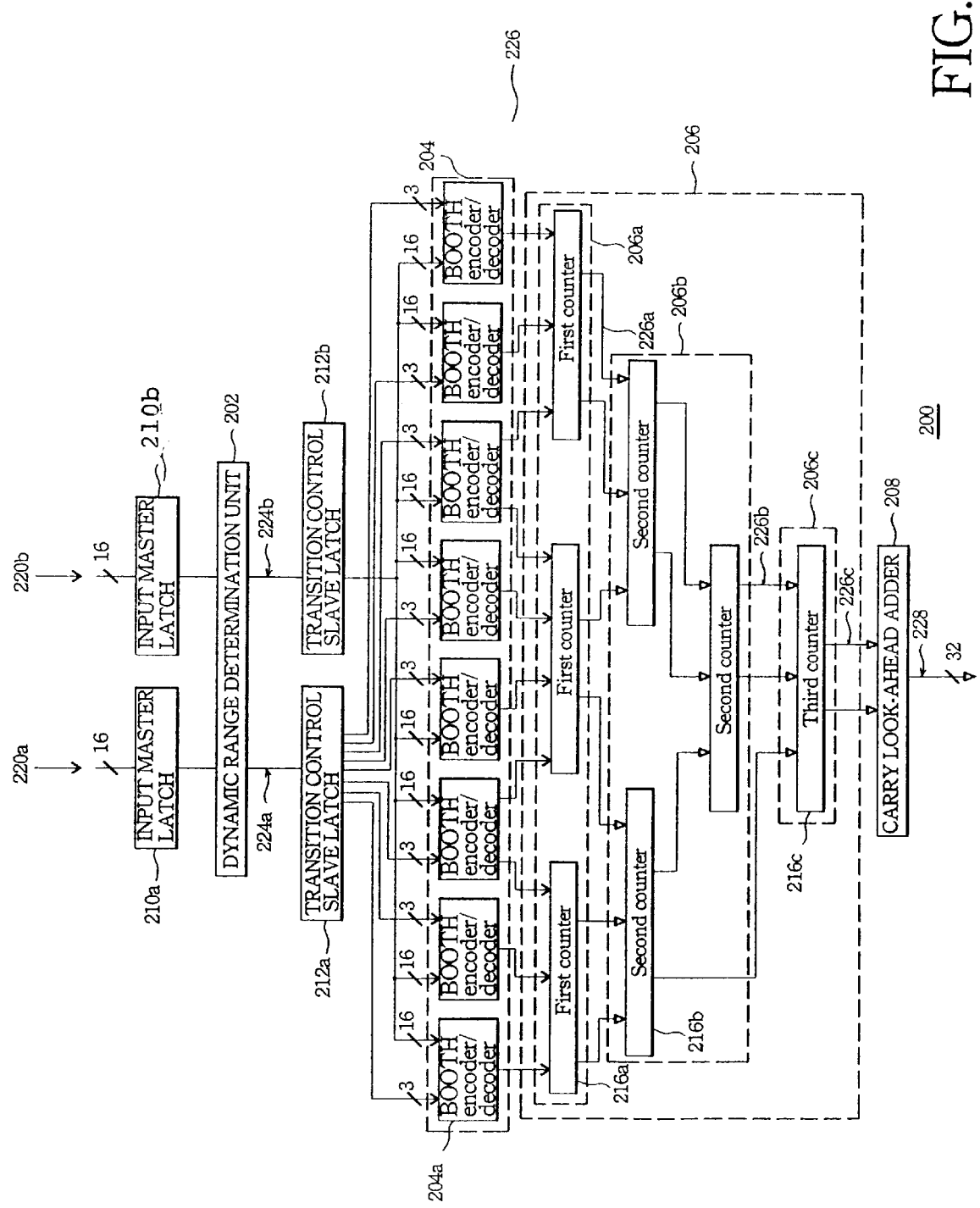
FIG. 2 is a schematic view of an energy saving multiplication device according to a preferred embodiment of the invention.

"With reference to FIG. 2, the multiplication device 200 according to a preferred embodiment of the invention includes a dynamic range determination unit 202, an encoding/decoding unit 204, a counter array 206, a carry look-ahead adder (CLA) 208, a first input master latch 210a, a second input master latch 210b, a first transition control slave latch 212a and a second transition control slave latch 212b. The dynamic range determination unit 202 couples to the first and second input master latches 210a, 210b and the first and second transition control slave latches 212a, 212b. Each Booth encoder/decoder 204a in the encoding/decoding unit 204 couples to the first and second transition salve latches 212a, 212b. The counter array 206 can be composed of a plurality of counting units 206a, 206b, 206c, each being composed of a plurality of counters 216a, 216b, 216c."

Figure 3:
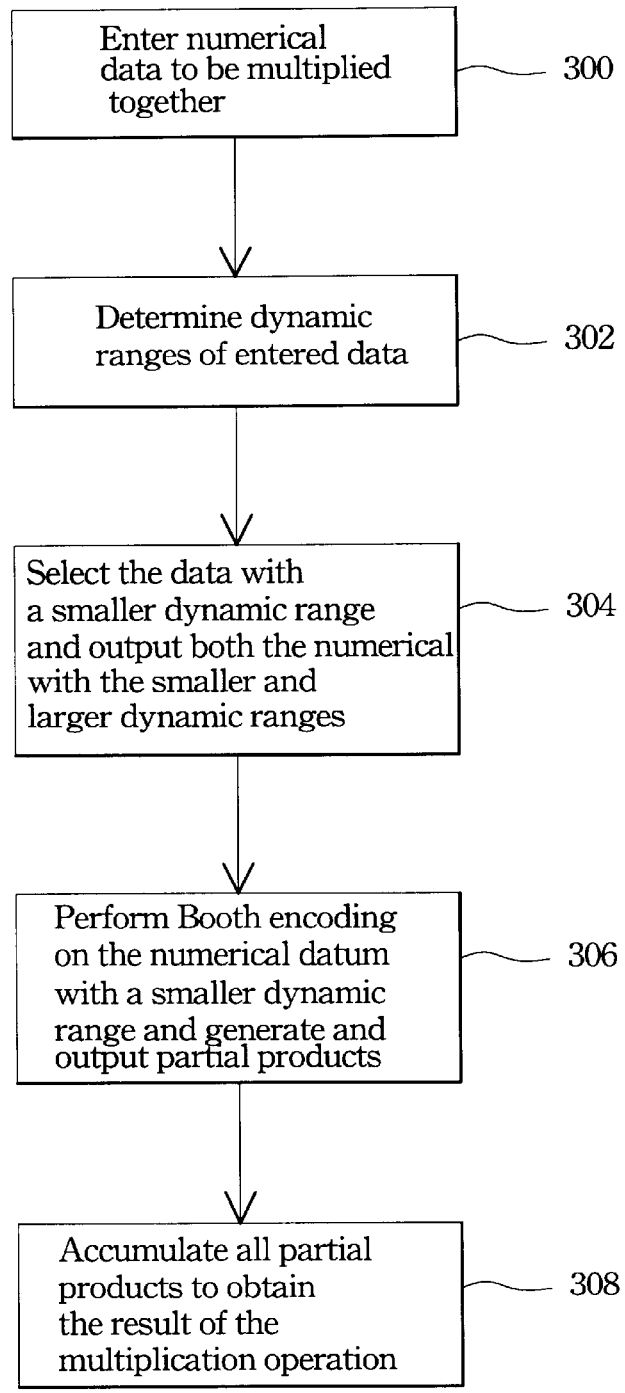
FIG. 3 is a schematic flow chart of an energy saving multiplication method according to a preferred embodiment of the invention.

Please refer to FIG. 3, which is a schematic flow chart of an energy saving multiplication method according to a preferred embodiment of the invention. As shown in step 300 in FIG. 3, numerical data to be multiplied together are first entered. With reference to FIG. 2 at the same time, a first numerical datum 220a and a second numerical datum 220b to be multiplied in the multiplication device 200 are received and transmitted by the first input master latch 210a and the second input master latch 210b, respectively. The first numerical datum 220a and the second numerical datum 220b are not necessarily the multiplicand and the multiplier, respectively, and they can be exchanged before the input.

Secondly, step 302 in FIG. 3 is performed to determine the dynamic ranges of the entered numerical data. With reference to FIG. 2 at the same time, the dynamic range determination unit 202 receives the numerical data 220a, 220b entered through the input master latches 210a, 210b and detects to determine their dynamic ranges.

Figure 4:
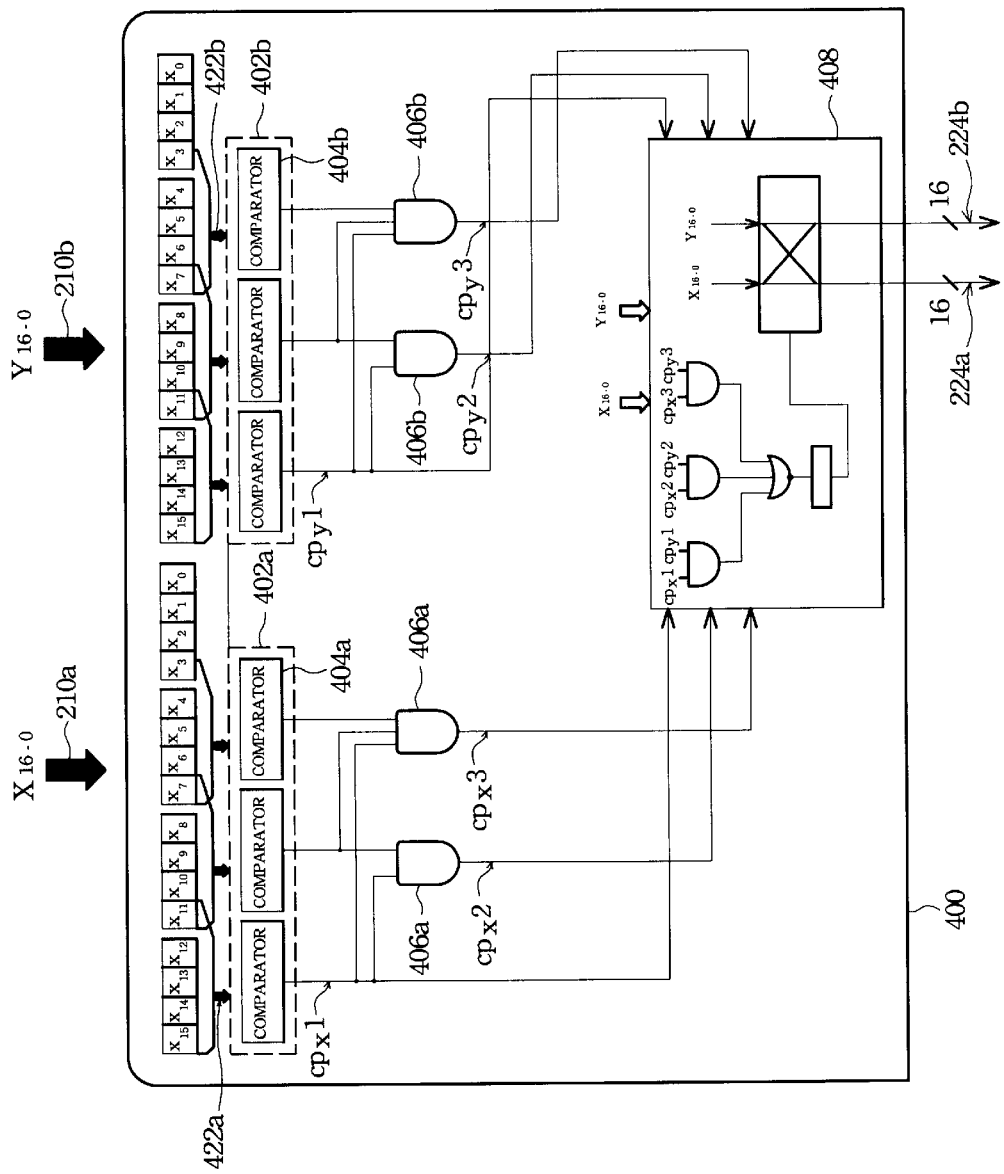
FIG. 4 is a schematic view of a structure of the dynamic range determination unit in an energy saving multiplication device according to a preferred embodiment of the invention.

Referring simultaneously to FIG. 4 and FIG. 2, the same references relate to the same elements, data, and signals. When the dynamic range determination unit determines the dynamic range, any number of bits can be grouped together for the detection. In the current embodiment, 16-bit data and a radix-4 Booth encoding/decoding structure are employed to describe the invention. Therefore, the entered data are converted into groups of 4 bits to determine the dynamic ranges of numerical data. The method further determines whether they should be exchanged according to the dynamic ranges.

As shown in FIG. 4, the dynamic range determination unit 202 includes: a first comparison unit 402a, a second comparison unit 402b, a first AND gate 406a, a second AND gate 406b and a data switcher 408; wherein the first AND gate couples to the first comparison unit 402a, the second AND gate couples to the second comparison unit 402b, the data switcher 408 couples to the comparison units 402a, 402b and the AND gates 406a, 406b.

With reference to FIG. 2 at the same time, the first comparison unit 402a has a plurality of first comparators 404a to receive the first numerical datum 220a from the first input master latch 210a in FIG. 4 and converts the first numerical datum 220a into a plurality of first numerical segments 422a for output. The second comparator unit 402b has a plurality of second comparators 404b to receive the second numerical datum 220b from the second input master latch 210b and converts the second numerical datum 220b into a plurality of second numerical segments 422b for output. The first AND gate couples to the first comparator 404a and the second AND gate couples to the second comparator 404b.

The data switcher 408 in FIG. 4 couples to one of the first comparators 404a, one of the second comparators 404b, each first AND gate 406a and each second AND gate 406b to receive the first and second numerical data 220a, 220b. It further determines the relative size of the dynamic ranges of the first numerical data 220a and the second numerical data 220b in order to perform exchange of larger and smaller dynamic-range numbers. It then outputs the first datum 224a with a larger dynamic range and the second datum 224b with a smaller dynamic range. This is shown in step 304 in FIG. 3. The numerical datum with a smaller dynamic range is chosen to perform Booth encoding.

Referring to FIG. 4, the detection of data starts from most-significant bits and each time 5 bits form a group to be checked by the comparators 404a, 404b. A check bit is repeated between the continuous two groups to ensure the continuity of data during the check. As long as the data types are the same, e.g. all are either "0" or "1", then the signal output is controlled to be "1" and otherwise "0". Taking 16-bit data as an example, the check is performed on three groups and the last four bits are not checked. The data switcher 408 includes a circuit to perform data flows exchanges or unchanges. After the dynamic ranges of the two data are compared by the comparison units 402a, 402b, the data switcher 408 selects the one with a smaller dynamic range according to the control signals $cp_x1 \sim cp_x3$, $cp_y1 \sim cp_y3$ and output the first and second segments 224a, 224b as the multiplicand and the multiplier according to the dynamic range sizes of the data, where the dynamic range of the first segment 224a is not smaller than that of the second segment 224b.

Referring to step 306 in FIG. 3, the numerical datum with a smaller dynamic range is Booth encoded and the encoded codes with the one having a larger dynamic range are Booth decoded to generate partial product outputs. With reference to FIGS. 2 and 4 simultaneously, the first and second data 224a, 224b output from the dynamic range determination unit 202 are transmitted to each Booth encoder/decoder 204a of the Booth encoding/decoding unit 204. The Booth encoder/decoder unit 204 takes the second data 224b with a smaller dynamic range as the multiplier to perform Booth encoding. The first data 224a with a larger dynamic range is taken as the multiplicand according to the code to perform decoding for generating and outputting partial products 226. Since the numerical datum with a smaller dynamic range is taken to perform Booth encoding, there are fewer valid products generated.

Referring to step 308 in FIG. 3, all partial products are accumulated to obtain the product, the result of the multiplication operation. With simultaneous reference to FIG. 2, the partial products 226 generated by each Booth encoder/decoder 204a are received by the counter array 206 and accumulated. The CLA 208 then performs summation to obtain the product 228 of the entered numerical data 220a, 220b. Since the number of the valid partial products output from the Booth encoder/decoders 204a are fewer than that of a conventional one, the switching activities for performing additions in the counter array 206 will be reduced. The transition probability of the transistor in the circuit is thus smaller, thereby decreasing the power consumption.

Referring to FIG. 2 again, the counter array 206 includes a counter array with the Wallace tree structure, such as a first counting unit 206a, a second counting unit 206b and a third counting unit 206c. As shown in the drawing, the first counting unit 206a has a plurality of first counters 216a coupling to the corresponding Booth encoder/decoder 204a to receive and accumulate the partial products 226 and to generate and output a first partial product 226a. The second counting unit 206b also has a plurality of second counters 216b coupling to the corresponding first counters 216a of the first counting unit 206a, respectively, or other counters of the same counting unit to receive and accumulate the first partial product 226a and to generate and output a second partial product 226b. The third counting unit 206c is composed of at least a third counter 216c. It couples to the second counting unit 206b to receive the second partial product 226b to generate and output a third partial product 226c. After receiving all the third partial products 226c, the CLA 208 performs summation to obtain and output the product 228.

By entering data into a conventional Booth multiplier and the energy saving multiplication device of the present invention under different conditions, the experimental results show that using the number with a smaller dynamic range to perform Booth encoding can decrease the number of switching times. Referring to Table 1, the listed data are comparisons of total switching numbers for calculating partial products using a conventional Booth multiplier and the disclosed energy saving Booth multiplication device when the numerical data entering the multiplier are randomly generated and the dynamic ranges of entered numerical data are assumed to have a uniform distribution. The analysis method adopted in Table 1 is to perform Booth encoding on 16-bit data in radix-4. Each of the 8 partial products generated after the Booth decoding is to perform the bit-switching comparison with its previous data. This is then the total switching number for performing the multiplication operation.

TABLE 1

Comparisons of total switching numbers for calculating partial products using a conventional Booth multiplier and the disclosed energy saving Booth multiplication device when the dynamic ranges of input numerical data are assumed to have a uniform distribution.

| Dynamic range (bit) | Conventional multiplier | Disclosed multiplication device | Proportion saved (%) |
| --- | --- | --- | --- |
| 1–4 | 15.26 | 13.20 | 13.47 |
| 1–8 | 26.25 | 21.06 | 19.77 |
| 1–12 | 36.33 | 28.06 | 22.75 |
| 1–16 | 46.05 | 34.87 | 24.28 |

The data shown in Table 1 indicate that using the number with a smaller dynamic range to perform Booth encoding can indeed lower the number of switching times. When the dynamic ranges of the input data become larger, the probability of exchanging numbers with smaller and larger dynamic ranges increases among the randomly generated data. Thus, using the device or method of the invention can save more switching times than the conventional multiplier.

Referring to Table 2, whose content is similar to that of Table 1. The data listed in Table 2 are comparisons of total switching numbers for calculating partial products using a conventional Booth multiplier and the disclosed energy saving Booth multiplication device when the numerical data entering the multiplier are generated according to the Gaussian distribution and the dynamic ranges of entered numerical data are also assumed to have the Gaussian distribution. Table 2 analyzes the situation where the dynamic ranges of the input numerical data are assumed to have the Gaussian distribution with different means of 4, 8, and 12 and different variances of 1, 3, and 5. The data in Table 2 show that when the means of input data are the same, the larger the variance is the more probably the numerical data with smaller and larger dynamic ranges will exchange and therefore the more switching times there will be saved. When the variances of input data are the same, the larger the mean is the fewer switching times there will be saved. This is because the probability of generating a partial product of 0 for an encoded numerical datum with a larger dynamic range is smaller; thus the number of switching times does not decrease very much.

TABLE 2

Comparisons of total switching numbers for calculating partial products using a conventional Booth multiplier and the disclosed energy saving Booth multiplication device when the dynamic ranges of input numerical data are assumed to have the Gaussian distribution.

| Dynamic range (bit) | | Conventional multiplier | Disclosed multiplication device | Proportion saved (%) |
| --- | --- | --- | --- | --- |
| Mean | Variance | | | |
| 4 | 1 | 23.81 | 21.95 | 7.81 |
|  | 3 | 18.35 | 13.41 | 26.9 |
|  | 5 | 14.11 | 7.29 | 48.33 |
| 8 | 1 | 39.84 | 38.41 | 3.58 |
|  | 3 | 34.94 | 30.77 | 11.93 |
|  | 5 | 30.15 | 23.26 | 22.85 |
| 12 | 1 | 55.80 | 54.44 | 2.44 |
|  | 3 | 51.00 | 46.89 | 8.05 |
|  | 5 | 46.26 | 39.64 | 14.31 |

The structure of the disclosed energy saving multiplication device, as shown in FIG. 2, can include a unit 202 that can detect the dynamic-range magnitudes of numerical data, eight Booth encoders/decoders 204a, eight counters 216a, 216b, 216c. The operational procedure is shown in FIG. 3. For example, if effective dynamic ranges of the entered data are 4 bits and 16 bits, respectively, the 4-bit data are Booth encoded in order to save the power consumption of six Booth encoders/decoders and three counters.

Taking a 16×16-bit multiplier with the Wallace tree structure, the number of transistors in a conventional multiplier is about 6700, whereas that of the multiplication device disclosed herein is 6990. The result of using the module made by the 0.35-micron ($\mu$m) technology provided by Taiwan Semiconductor Manufacturing Company Ltd. (TSMC) to perform analysis on the power consumption of the multiplier with the Wallace tree structure is as follows.

Referring to Table 3, the listed data are comparisons of the power consumption for computing partial products using a conventional Booth multiplier and the disclosed energy saving Booth multiplication device when the dynamic ranges of input data have a uniform distribution.

TABLE 3

Comparisons of the power consumption for computing partial products using a conventional Booth multiplier and the disclosed energy saving Booth multiplication device when the dynamic ranges of input data have a uniform distribution.

| Dynamic range (bit) | Power consumption in a conventional multiplier (mW) | | | Power consumption of the disclosed multiplication device (mW) | | | | | Proportion of energy saved (%) |
|---|---|---|---|---|---|---|---|---|---|
| | Register | Booth encoder and counter array | Total | Master stage | Dynamic range determination unit | Slave stage | Booth encoder and counter array | Total | |
| 1–4 | 0.99 | 19.59 | 20.58 | 0.5 | 1.2 | 0.4 | 18.60 | 20.70 | −1.02 |
| 1–8 | 1.00 | 21.82 | 22.82 | 0.5 | 1.2 | 0.4 | 19.49 | 21.59 | 4.95 |
| 1–12 | 1.00 | 24.15 | 25.25 | 0.6 | 1.2 | 0.5 | 21.09 | 23.39 | 7.36 |
| 1–16 | 1.00 | 26.11 | 27.21 | 0.6 | 1.2 | 0.5 | 22.60 | 24.90 | 8.48 |

As shown in Table 3, when the dynamic range of the input data is 16 bits, the power consumption of the disclosed multiplication device is about 24.90 mW, saving about 8.48% of the power consumed by the conventional multiplier. When the dynamic range of the input data becomes bigger, the increase in power consumption of the present invention is much less than that of the conventional one because the invention uses the datum with a smaller dynamic range to perform Booth encoding. The proportion of energy saved will increase as the dynamic range of the input data increases.

Referring to Table 4, whose content is similar to that of Table 3. The data listed in Table 4 are comparisons of the power consumption for computing partial products using a conventional Booth multiplier and the disclosed energy saving Booth multiplication device when the numerical data entering the multiplier are generated according to the Gaussian distribution and the dynamic ranges of entered numerical data are also assumed to have the Gaussian distribution. The analysis in Table 4 is similar to that in Table 2. Both analyze the situation where the dynamic ranges of the input numerical data are assumed to have the Gaussian distribution with different means of 4, 8, and 12 and different variances of 1, 3, and 5.

The data in Table 4 show that when the variances of input data are the same, the larger the mean is the more power consumption there is. This is because the larger the mean is the larger the dynamic range of data is, thus increasing the element uses. When the means of input data are the same but the variance changes, the larger variance has a larger dynamic-range difference between two input data so that the small dynamic range has a higher probability to appear; thus more probably to save more power and to lower the average power consumption.

TABLE 4

Comparisons of the power consumption for computing partial products using a conventional Booth multiplier and the disclosed energy saving Booth multiplication device when the dynamic ranges of entered numerical data are assumed to have the Gaussian distribution.

| Dynamic range (bit) | | Power consumption in a conventional multiplier (mW) | | | Power consumption of the disclosed multiplication device (mW) | | | | | Proportion of energy saved (%) |
|---|---|---|---|---|---|---|---|---|---|---|
| Mean | Variance | Register | Booth encoder and counter array | Total | Master latch | Dynamic range determination unit | Slave latch | Booth encoder and counter array | Total | (%) |
| 4 | 1 | 1.0 | 20.46 | 21.46 | 0.5 | 1.2 | 0.5 | 19.77 | 21.97 | −2.3 |
| | 3 | 1.1 | 21.79 | 22.89 | 0.5 | 1.2 | 0.6 | 20.15 | 22.45 | 1.92 |
| | 5 | 1.1 | 22.58 | 23.68 | 0.5 | 1.2 | 0.6 | 19.98 | 22.28 | 5.91 |
| 8 | 1 | 1.0 | 25.41 | 26.41 | 0.5 | 1.2 | 0.5 | 23.67 | 25.87 | 2.04 |
| | 3 | 1.1 | 26.20 | 27.30 | 0.5 | 1.2 | 0.6 | 23.57 | 25.87 | 5.23 |
| | 5 | 1.1 | 26.42 | 27.52 | 0.5 | 1.2 | 0.6 | 23.25 | 25.55 | 7.15 |
| 12 | 1 | 1.1 | 28.23 | 29.33 | 0.5 | 1.2 | 0.6 | 25.77 | 28.07 | 1.87 |
| | 3 | 1.1 | 28.34 | 29.44 | 0.5 | 1.2 | 0.6 | 25.48 | 27.78 | 5.63 |
| | 5 | 1.1 | 28.10 | 29.20 | 0.5 | 1.2 | 0.6 | 24.85 | 27.15 | 7.02 |

In practice, we will take the linear prediction code of the G.729 speech coder set by the International Telecommunication Union (ITU) the adaptive differential pulse code modulation (APPCM) of the G.722 audio coder set by the Consultative Committee of International Telephone & Telegraphy (CCITT) and the wavelet transform of the image compression to perform power analyses on a conventional multiplier and the disclosed energy saving multiplication device.

According to the G.729 speech coder, the linear prediction code (LPC) is employed to process a section of speech for about 2 seconds sampled at 8 KHz so as to analyze and compare multiplication operations of the autocorrelation performed by the speech signals. The power consumed in the conventional multiplier is 21.94 mW, whereas the power consumed in the present invention is about 20.6 mW, saving about 6.1% of the energy.

The multiplication operations of the ADPCM choose audio signals of about 5 seconds to perform high-pass and low-pass band splitting and predictions of signals. Since the multiplier is operating at a fixed point, a normalization action to scale up the filter coefficients has to be taken before band splitting. From the analysis, one knows that the power consumed in the conventional multiplier is 22.46 mW, whereas the power consumed in the present invention is about 20.2 mW, saving about 10.5% of the energy.

In the application of wavelet transform, a Lena image with 256×256 pixels is taken to analyze the multiplication operations when signals pass through a wavelet filter. In accordance with the fixed-point computation mode of the multiplier, the parameters of the wavelet filter have to undergo a normalization procedure. The power consumed by the conventional multiplier is 26.45 mW, whereas the power consumed in the present invention is about 23.35 mW, saving about 11.72% of the energy.

From the previously described preferred embodiments, one knows that the present invention determine the dynamic ranges of input data and exchange the larger and smaller numbers. When the dynamic ranges of the entered two data have a larger variance, more energy can be saved. The structure and method of such number exchanges can be applied to all multiplication devices using Booth encoding/decoding to generate partial products to reduce power consumption in multiplication operations.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multiplication device, the device comprising:

a dynamic range determination unit, which receives a first numerical value and a second numerical value, determines the size relations of the dynamic ranges of each of the first numerical value and the second numerical value and outputs a first data and a second data, wherein the dynamic range of the first data is smaller than the dynamic range of the second data;

a plurality of encoders/decoders coupling to the dynamic range determination unit, which receives the first data and the second data, takes the first-data as the multiplier to perform encoding/decoding with the second data, and to generate and output a plurality of partial products from the second data; and a counter array coupling to the plurality of encoders/decoders, which receives and accumulates the plurality of partial products.

2. The device of claim 1, further comprising a first input latch and a second input latch coupling to the dynamic range determination unit for receiving the first numerical value and the second numerical value and transferring the first numerical value and the second numerical value to the dynamic range determination unit, respectively.

3. The device of claim 1, further comprising a first output latch and a second output latch coupling to the dynamic range determination unit for transferring the first data and the second data.

4. The device of claim 1, wherein the dynamic range determination unit further comprises:

a first comparison unit for receiving the first numerical value and converting the first numerical value into the plurality of first numerical segments for comparison, and compare the bits of the plurality of first numerical segments;

a second comparison unit for receiving the second numerical value and converting the second numerical value into the plurality of second numerical segments for comparison, and compare the bits of the plurality of second numerical segments;

a plurality of first AND gates coupling to the first comparison unit and generating a first numerical effective dynamic range control signal;

a plurality of second AND gates coupling to the second comparison unit and generating a second numerical effective dynamic range control signal; and a data switcher coupling to the first comparison unit, the plurality of first AND gates, the second comparison unit, and the plurality of second AND gates for receiving the first numerical value and the second numerical value to determine the dynamic range size relations of each of the first and second numerical values and to output the first data and the second data, respectively.

5. The device of claim 4, wherein the first comparison unit comprises a plurality of first comparators coupling to the plurality of first AND gates and the data switcher, respectively.

6. The device of claim 4, wherein the second comparison unit comprises a plurality of second comparators coupling to the plurality of second AND gates and the data switcher, respectively.

7. The device of claim 1, wherein the counter array further comprising:

a plurality of first counters coupling to the plurality of encoders/decoders, respectively, for receiving and accumulating the plurality of partial products to generate and output a plurality of first partial products;

a plurality of second counters coupling to the plurality of first counters, respectively, for receiving and accumulating the plurality of first partial products to generate and output a plurality of second partial products; and a third counter coupling to the plurality of second counters for receiving and accumulating the plurality of second partial products to generate and output a plurality of third partial products.

8. The device of claim 7 further comprising a carry look-ahead adder (CLA) coupling to the third counter to receive and accumulate the plurality of third partial products to generate a product of the first numerical value and the second numerical value.

9. The device of claim 1 further comprising a CLA coupling to the counter array to compute the plurality of partial products to generate a product of the first numerical value and the second numerical value.

10. A multiplication device, which comprises:

a first input master latch for receiving a first numerical value;

a second input master latch for receiving a second numerical value;

a dynamic range determination unit coupling to the first input master latch and the second input master latch for receiving the first numerical value and the second numerical value, determining the dynamic range size relations of the first numerical value and the second numerical value and output a first data and a second data, wherein the dynamic range of the first data is not greater than the dynamic range of the second data;

a first transition control slave latch coupling to the dynamic range determination unit for transferring the first data;

a second transition control slave latch coupling to the dynamic range determination unit for transferring the second data;

a plurality of encoders/decoders coupling to the first transition control slave latch and the second transition control slave latch for receiving the first data and the second data, taking the first data as the multiplier to perform encoding/decoding on the first data, and combining with the second data to generate and output a plurality of partial products;

a counter array coupling to the plurality of encoders/decoders to receive and accumulate the plurality of partial products; and a carry look-ahead adder (CLA) coupling to the counter array to compute the plurality of partial products to generate a product of the first numerical value and the second numerical value.

11. The device of claim 10, wherein the dynamic range determination unit further comprising:

a plurality of first comparators coupling to the first input master latch for receiving the first numerical value and converting the first numerical value into the plurality of first numerical segments for comparison, and compare the bits of the plurality of first numerical segments;

a plurality of second comparators coupling to the second input master latch for receiving the second numerical value and converting the second numerical value into the plurality of second numerical segments for comparison, and compare the bits of the plurality of second numerical segments;

a plurality of first AND gates coupling to the plurality of first comparators and generating a first numerical effective dynamic range control signal;

a plurality of second AND gates coupling to the plurality of second comparators and generating a second numerical effective dynamic range control signal; and a data switcher coupling to one of the plurality of first comparators, the plurality of first AND gates, one of the plurality of second comparators, and the plurality of second AND gates for receiving the first numerical value and the second numerical value to determine the dynamic range size relations of the first numerical value and the second numerical value and to output the first data and the second data to the first transition control slave latch and the second transition control slave latch.

12. A multiplication operation method, which comprises the steps of:

entering a first numerical value and a second numerical value, respectively;

determining the dynamic range size relations of the first numerical value and the second numerical value and outputting a first data and a second data, respectively, wherein the dynamic range of the first data is not greater than the dynamic range of the second data;

taking the first data as the multiplier to perform encoding/decoding on the first data; and processing the encoded/decoded first data and the second data to generate partial products.

13. A multiplication operation method, which comprises the steps of:

entering a first numerical value and a second numerical value, respectively;

determining the dynamic range size relations of the first numerical value and the second numerical value and outputting a first data and a second data, respectively, wherein the dynamic range of the first data is not greater than the dynamic range of the second data;

taking the first data as the multiplier to perform encoding/decoding on the first data;

processing the encoded/decoded first data and the second data to generate a plurality of partial products; and performing shifts and accumulation on the plurality of partial products to obtain a product of the first numerical value and the second numerical value.

* * * * *